United States Patent [19]

Sevcik et al.

[11] 4,130,705
[45] Dec. 19, 1978

[54] POLYMERS OF PIVALOYLOXYALKYL METHACRYLATES, METHOD FOR THEIR PREPARATION AND MODIFICATION

[75] Inventors: Stanislav Sevcik; Jiří Trekoval; Jan Holata; Jiří Stamberg, all of Prague, Czechoslovakia

[73] Assignee: Ceskoslovenska akademie ved, Prague, Czechoslovakia

[21] Appl. No.: 783,398

[22] Filed: Mar. 31, 1977

Related U.S. Application Data

[63] Continuation-in-part of Ser. No. 590,635, Jun. 26, 1975, abandoned.

[30] Foreign Application Priority Data

Jun. 27, 1974 [CS] Czechoslovakia ............... 4540-74
Jun. 27, 1974 [CS] Czechoslovakia ............... 4541-74
Jun. 27, 1974 [CS] Czechoslovakia ............... 4542-74

[51] Int. Cl.² .................. C08F 22/10; C08F 4/32; C08F 4/34
[52] U.S. Cl. .................................. 526/230; 526/47; 526/49; 526/173; 526/181; 526/232; 526/328; 526/329
[58] Field of Search ............. 526/328, 329, 230, 232

[56] References Cited

U.S. PATENT DOCUMENTS 3,454,446  7/1969  Sakuragi et al. ............... 156/310
3,544,505  12/1970  Nagata et al. ............... 260/37

Primary Examiner—William F. Hamrock

[57] ABSTRACT

The invention relates to polymers and copolymers of pivaloyloxyalkyl methacrylates which contain structural units of the general formula

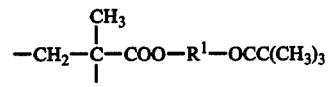

where $R^1$ is $(CH_2)_{n_1}$—O ($n_1$ = 2 to 10) or $(CH_2CH_2$—O$)_{n_2}$ ($n_2$ = 1 to 4) and to the method of their preparation and modification. The polymerization and copolymerization can be initiated by free-radical initiators of the peroxy type or by anionic initiators, e.g., alkali metal alkoxides or butyllithium, and carried out in a solution, bulk or suspension process in the presence of a crosslinking agent or without it. Anionic polymerization may result in stereoregular polymers or may be used for preparation of block copolymers by the "living" polymer technique. The polymers and copolymers can be modified by the partial or toal conversion of the pivaloyloxyalkyl methacrylate units into hydroxyalkyl methacrylate units by selective hydrolysis, alcoholysis or other reaction.

5 Claims, No Drawings

POLYMERS OF PIVALOYLOXYALKYL METHACRYLATES, METHOD FOR THEIR PREPARATION AND MODIFICATION

RELATED APPLICATION

This application is a continuation-in-part of application Ser. No. 590,635, filed June 26, 1975, now abandoned.

BACKGROUND OF THE INVENTION

The invention relates to polymers of pivaloyloxyalkyl methacrylates containing structural units of the general formula I:

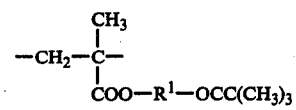

where $R^1$ is $(CH_2)_{n_1}$—O ($n_1$ = 2 to 10) or $(CH_2CH_2$—$O)_{n_2}$ ($n_2$ = 1 to 4); to the method of their preparation, as well as to the method for preparation of block copolymers consisting of a polymethacrylate block and a poly(pivaloyloxyalkyl methacrylate) block, by the polymerization initiated with anionic and free-radical initiators and to modification of the polymers and copolymers of pivaloyloxyalkyl methacrylates (including the block copolymers) resulting in the partial or total conversion of hydrophobic pivaloyloxyalkyl methacrylate units into hydrophilic hydroxyalkyl methacrylate polymers or copolymers.

Poly(glycol methacrylates) have a very broad application, e.g. in medicine, as materials for gel permeation chromatography and the like. Monomeric glycol methacrylate may be readily polymerized by the free-radical method. Anionic polymerization of glycol methacrylate is impossible because the hydrogen atom of the alcohol group of the monomer decomposes the anionic initiator by its acidity and deactivates the formed initiation centers. This is the reason why the possibility of blocking the alcohol group of the monomer by acylation was investigated. It can be assumed, from former studies by the inventors, that the successful polymerization of acylated glycol methacrylates may be realized with such acyl residues which contain only one or better no hydrogen atom in the α-position. However, it was proved that in the polymerization of methylmethacrylate using the organometal type of initiators, as n-butyllithium, and also using a group of less basic initiators as alkali metal tert-alkoxides (e.g. lithium tert-butoxide), the presence of an acyl residue with hydrogen atoms in the α-position, e.g., of alkyl acrylates, inhibit the polymerization reaction due to condensation reactions of acrylates with the aforesaid basic reagents.

By the procedures known until now, stereoregular poly(hydroxyalkyl methacrylates) and block copolymers containing both the lyophilic block(s) and the block(s) of hydrophilic hydroxyalkyl methacrylate structural units also could not be prepared.

According to the invention, the homopolymerization of pivaloyloxyalkyl methacrylates of the general formula II:

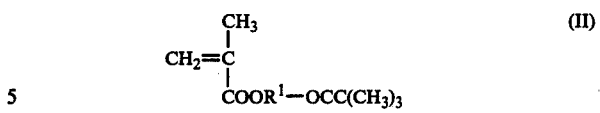

where $R^1$ has the above given meaning, may be carried out both by free radical initiators of the peroxy type and by anionic initiators. Anionic initiators used in the homopolymerization of the methacrylate type of monomers enable the advantageous preparation of polymers which substantially differ by their microstructure expressed as the tacticity degree. Thus, for example, lithium initiators form isotactic polymers in a hydrocarbon medium, while atactic to syndiotactic polymers are formed in a polar medium, e.g., in tetrahydrofuran. In conjunction with diverse tacticity, these polymers differ also in their mechanical properties, e.g., in the glass-transition temperature and the like.

The technique of preparing "living" polymers by anionic polymerization is not only the most advantageous one but virtually the only possible method for the preparation of block copolymers. It consists in polymerization of the first monomer by means of an anionic initiator up to the conversion of 100%, while the reactivity of the growing end of the polymeric chain is preserved at the same time and enables the second monomer added to be incorporated also.

Homopolymerizaton of pivaloyloxyalkyl methacrylates by the radical mechanism was effected by the use of free-radical polymerization initiators of the peroxy type, e.g. by dibenzoyl peroxide and isopropyl peroxycarbonate in a benzene solution and by a bulk process. The preparation of the pivaloyloxyalkyl methacrylate homopolymer in the presence of a crosslinking agent, e.g. glycol dimethacrylate, was also confirmed. Polymers with a network structure are formed during polymerization of pivaloyloxyalkyl methacrylates in the presence of a crosslinking agent, e.g. glycol dimethacrylate, which are insoluble in organic solvents and which only swell according to the amount of the crosslinking agent — glycol dimethacrylate — used.

Homopolymerization of pivaloyloxyalkyl methacrylate by the anionic mechanism was effected by the use of alkali metal tert-alkoxides, e.g. sodium tert-butoxide, or lithium organometallic compounds, e.g. n-butyllithium, as initiators. The polymerization by alkali metal tert-alkoxides proceeds at ambient temperature. The polymerization of pivaloyloxyalkyl methacrylates using n-butyllithium proceeds in bulk or in solution at the lowered temperature of −30° to −70° C. The anionic polymerization of pivaloyloxyalkyl methacrylates in the presence of glycol dimethacrylate was also confirmed. Polymers with a network structure are formed during polymerization in the presence of a crosslinking agent, e.g. glycol dimethacrylate, which are insoluble in organic solvents and only swell according to the amount of the crosslinking agent — glycol dimethacrylate — used.

If pivaloyloxyalkyl methacrylate contains a small amount of the crosslinking agent — glycol dimethacrylate, e.g. 1 to 2 percent, the suitably chosen concentrations of the monomer and initiator enable the preparation of a polymer which is soluble in organic solvents, as in benzene, toluene, chloroform, etc.

Block copolymers of methacrylates with pivaloyloxyalkyl methacrylates were prepared by the technique of anionic "living" polymers. The polymerization of the first monomer (methacrylate) was initiated by n-butyllithium in toluene solution at a temperature of −70° C. to prevent potential side reactions of the polymeric-chain growing center with the ester group by a reaction of the Grignard type. This reaction proceeds at a temperature of e.g. +20° C. to a considerable degree and leads to termination of the polymeric chains, which are then unable to bind further molecules of the monomer.

After the first monomer — methacrylate — had been consumed, the second monomer — pivaloyloxyalkyl methacrylate — was added and the polymerization was allowed to proceed to total conversion. The block copolymer obtained was then precipitated by methanol, reprecipitated and dried in vacuum at 45° C. to constant weight. The methanol used contains a small amount of acetic acid to prevent alcoholysis.

The present method may be used for preparation of stereoregular homopolymers of pivaloyloxyalkyl methacrylates and block copolymers of these compounds with other methacrylates (methyl methacrylate, butyl methacrylate and the like). Poly(hydroxyalkyl methacrylates) or their block copolymers of corresponding tacticity may be obtained by a simple modification reaction of these polymers of various tacticity (isotactic, syndiotactic and atactic polymers). Until now, the preparation of a block copolymer which contained the blocks of hydrophobic and hydrophilic structural units has not been possible, because a monomer with hydrophilic groups reacted irreversibly with the anionic polymerization catalyst and interfered with the polymerization process.

The use of the monomers, which have their hydrophilic group protected in the form of a suitable ester, enables, besides the radical polymerization, also the anionic polymerization or copolymerization and also the block copolymerization. According to this invention, the protective groups in the prepared polymers are removed in part or totally giving rise to the hydrophilic hydroxyalkyl methacrylate structural units:

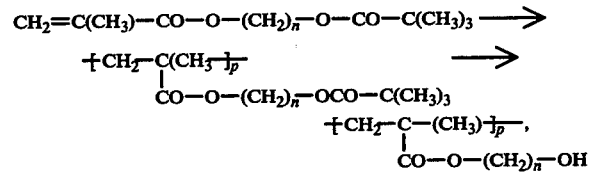

where
p is the polymerizaton degree and
n is an integer $\geq 2$.

A feature of this process is the different cleavage rates of various types of ester bonds in one structural unit, namely, the substantial stability of the ester bond of the polymethacrylic skeleton and the relatively easy cleavability of the protective group ester bond.

The partial or total removal of the protective groups may be carried out in many ways, e.g. by hydrolysis, alcoholysis, aminolysis, etc., under conditions such that the difference between the higher reactivity of the ester bond of the protective group and the substantially lower reactivity of the ester bond of the polymeric skeleton remians preserved.

A suitable way can be, for example, alcoholysis catalyzed by the alkoxide which was used in the polymerization or was formed by the reaction of the anionic catalyst with added alcohol. The hydrolytic reaction can desirably be conducted at 0°–100° C.

The hydrolyzation of poly(pivaloyloxyethyl methacrylate) can for example be preferable carried out at room temperature.

After the desired degree of hydrolysis is achieved, the excess of the basis is neutralized, the aceton is evaporated and the polymer precipitated in water, in which the side products remain soluble.

The aminolysis in methanolic solution of ammonia practically does not run.

The reaction may be realized by the treatment with natriumamide in liquid ammonia. The basis can be neutralized with ammonium chloride and after the evaporation of ammonia the polymer is soluted in boiling ethanol. The polymer is preferably precipitated in ether, in which pivalamide remains dissolved.

The reaction may be performed with soluble as well as with crosslinked (co)polymers, homopolymers and block copolymers.

Monomers containing more than one vinyl group may be advantageously used as the crosslinking agents, namely those selected from a group comprising ethylene glycol dimethacrylate or diacrylate, diethylene glycol dimethacrylate, glycol divinyl ether, divinyl adipate, divinyltoluene, trivinylbenzene, divinylbenzene, divinylnaphthalene, triallyl cyanurate, and the like.

The resulting modified polymers may be used in cases where the different affinity of the hydrophilic part of the macromolecule for polar molecules (e.g. water, biological fluids, etc.) and where the hydrophobic interaction of the non-polar residue of the macromolecules plays a role, e.g. at phase interfaces, in the transport of polar or non-polar molecules through films and membranes formed by block copolymers — poly(hydroxyethyl methacrylate-b-methyl methacrylate), and the like.

The polymers according to the invention may be advantageously used, for example, as:

1. Synthetic leathers with hygienic properties — the properties may be varied by the ratio of methyl methacrylate and pivaloyloxyethyl methacrylate; and by the degree of hydrolysis.

2. Chromatographic materials, either in the non-hydrolyzed form or in the partially to totally hydrolyzed forms of protective groups.

3. Medical applications employing the basic non-modified (co)polymer, which is then subjected to a suitable modification reaction (e.g. hydrolysis) to form the hydrophilic layer on the article surface.

The invention is further illustrated in examples of performance without limiting its scope to these examples by any means.

The pivaloyloxyethyl methacrylate used in the examples was prepared by the reaction of pivaloyl chloride having the formula III

 (III)

with 2-hydroxyethyl methacrylate in a pyridine medium according to the scheme:

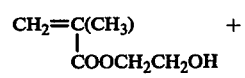 +

-continued

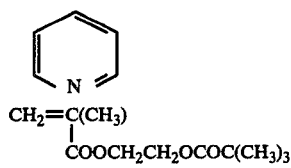

The preparation of diethylene glycol pivaloyl methacrylate

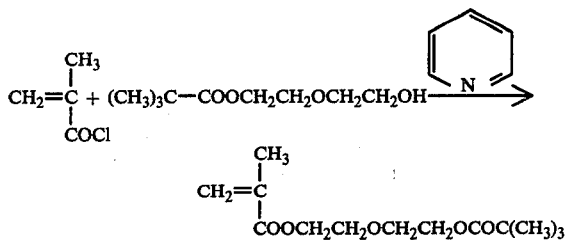

A 500 ml flask equipped with a magnetic stirrer and a reflux condenser was charged with 250 ml of dry benzene, 34.35 g. (0.180 mol) diethylene glycol pivalate, 18.48 g. (0.23 mol) of pyridine and 0.3 g. of phenthiazine. A solution of 20.75 g. (0.198 mol) of methacryloyl chloride in 100 ml of dry benzene was gradually added to the mixture under stirring within 20 minutes. The mixture was then stirred for 2 hours at room temperature. The reaction mixture was then diluted with 400 ml of benzene and the solution was then shaken four times with 30 ml portions of 0.5N HCl, four times with 50 ml portions of 5% NaHCO₃ solution and six times with 50 ml portions of water.

The benzene solution is dried over Na₂SO₄. After the benzene was distilled off the fraction boiling at 82.5°–83° C./0.2 mmHg was collected; the yield was 38.04 g. (81.56%).

Pivaloyloxyethyl methacrylate was prepared, for example, in the following way:

A 250 ml. flask equipped with a magnetic stirrer was charged with 9.11 g. (0.07 mole) of 2-hydroxyethyl methacrylate, 0.5 g. of hydroquinone and 60 ml. of anhydrous pyridine. A solution of 9.3 g. (0.077 mole) of pivaloyl chloride in 25 ml. of pyridine was gradually added to the mixture under stirring at the temperature of 30°–35° C. within 10 minutes. The mixture was then heated for 2 hours at the temperature of 40° C. The reaction mixture was then poured into 600 ml. of water, acidified with HCl and extracted five times with 200 ml. portions of ether. The ether extracts were twice shaken with 25 ml. portions of 5% Na₂CO₃ solution and three times with 25 ml. portions of water, dried over MgSO₄ and the ether was removed by distillation. The fraction boiling at 79°–80° C./1.5 mm. Hg was collected; the yield was 10.91 g. (72.74%).

EXAMPLE 1

A vessel, previously flushed with argon or bulb nitrogen, was charged with 8.8 ml. of toluene, 0.007 g. of a free-radical initiator — isopropyl peroxycarbonate, and 1 ml. of pivaloyloxyethyl methacrylate. After the initiator was dissolved, the temperature of the polymerization mixture was gradually elevated from 30° C. to 70° C. during 5 hours. The polymer was obtained in an almost 100% yield.

EXAMPLE 2

The polymerization described in Example 1 was carried out without solvent.

EXAMPLE 3

Into a previously evacuated, flame-heated vessel which was flushed with an inert gas (bulb nitrogen, argon), 2.3 ml. of pivaloyloxyethyl methacrylate (previously dried over CaH₂) and 0.039 g. of sodium tert-butoxide in 2 ml. of toluene were introduced by a syringe in the countercurrent of the inert gas. After 24 hours of polymerization at 20° C., a 45% yield of the polymer was obtained.

EXAMPLE 4

The polymerization was carried out in the same way as in Example 3, but solid sodium tert-butoxide was used for initiation which was previously dissolved at a lower temperature.

EXAMPLE 5

The polymerization was carried out similarly as in Example 3, with the distinction that 7.6 ml. of toluene were added to 1.8 ml. of pivaloyloxyethyl methacrylate, the mixture was cooled to −78° C. and 0.44 ml. of 0.3N solution of n-butyllithium was added. After 25 hours, an 85% yield of the polymer was obtained.

EXAMPLE 6

The polymerizaton was carried out analogously as in Example 5, with the distinction that pivaloyloxyethyloxyethyl methacrylate was used instead of pivaloyloxyethyl methacrylate.

EXAMPLE 7

The polymerization was carried out similarly as in Example 3. 0.5 ml. of methyl methacrylate was added to 24 ml. of toluene, the polymerization mixture was cooled to the temperature of −78° C. and 1.1 ml. of 0.3N n-butyllithium were added. The polymerization of methyl methacrylate was finished after 1 to 5 hours. Pivaloyloxyethyl methacrylate (0.5 ml.) was added at −78° C. to the "living" poly(methyl methacrylate) obtained in this way. After 24 hours, the polymerization solution was mixed with, for example chloroform, and precipitated into methanol. The block copolymer was obtained in the yield of 0.8 g., i.e., 82%. It was insoluble in organic solvents where it only swelled (more than to a 15 fold increase in volume).

EXAMPLE 8

The polymerization was carried out as in Example 7, but cca a twofold amount of initiator was used, i.e., 2.3 ml. of 0.3N n-butyllithium. The polymer, well soluble in organic solvents, e.g. in chloroform, benzene, etc., was obtained by precipitation and isolation in the yield of 80%.

EXAMPLE 9

Poly(2-pivaloyloxyethyl methacrylate-b-methyl methacrylate), crosslinked with 1.89% of ethylene dimethacrylate (0.12523 g.), was swollen in 2.5 ml. of toluene. After 4.5 hours, 10 ml. of methanol and 0.63779 g. of an aqueous solution containing 0.51867 mequiv. of NaOH were added. The mixture was heated to 50° C.

and then allowed to stand at room temperature for 120 hours with occasional shaking. Then, it was evaporated to dryness in a rotary evaporator and the residue was freed of soluble compounds by two decantations with water (2×50 ml.) and filtration by means of an immersion sintered-glass filter. The filtrate was concentrated by evaporation in a rotary evaporator and used for determination of the basicity decrease after addition of HCl (2.501 ml. of 0.10107N HCl) by the reverse titration with 0.10482N NaOH on the indicator mixture (Phenol red + Bromothymol blue). The consumption of titrant (0.292 ml.) corresponded to the total removal of pivaloyl-groups. The result was confirmed by NMR spectra, which corresponded to the total hydrolysis of pivaloyl groups and an isotactic structure of the modified block copolymer.

EXAMPLE 10

A soluble copolymer, poly(2-pivaloyloxyethyl methacrylate-b-methyl methacrylate) (0.11864 g.), was swollen in 2.5 ml. of toluene and 10 ml. of methanol, and 0.59894 g. of an aqueous solution of NaOH (containing 0.48708 mequiv. NaOH) was then added. The further procedure was similar to that presented in the preceding example. The conversion of pivaloyl groups amounted to 83.64% after 10 hours.

EXAMPLE 11

A previously evacuated, flame-heated vessel, which was flushed with an inert gas (bulb nitrogen or argon), was charged with 24 ml. of toluene and 1.5 ml. of methyl methacrylate by means of a syringe in the countercurrent of the inert gas. The polymerization mixture was cooled to −78° C. and 23 ml. of 0.3N butyllithium were added. The polymerization was completed after 1 to 5 hours. The resulting "living" poly(methyl methacrylate) was mixed with 0.5 ml. of 2-pivaloyloxyethyl methacrylate at −78° C. The polymerization mixture contained, after 24 hours, the block copolymer of methyl methacrylate and 2-pivaloyloxyethyl methacrylate and was treated with 5 ml. of methanol which had been previously dried with barium oxide and sodium metal. The mixture was heated to boiling and refluxed for 2 hours. A mixture of methyl pivalate and methanol was then removed by distillation in the boiling region of 61.3°–62° C. After completed distillation, another 5 ml. of methanol were added and the mixture was again heated and distilled. The resulting polymer was analyzed by the NMR method, which proved an absence of CH$_3$ groups of the pivaloyl residues.

EXAMPLE 12

To 1.0 g. of poly(pivaloyloxyethyl methacrylate) (4.67 mmol of structural units) in liquid ammonia (25 g.) was added 0.2 g. (5.13 mmol) of natrium-amide and the solution was let to stand for 24 hours. The polymer was then extracted with 15 ml. of boiling ethanol, the NaCl was filtered off and the polymer precipitated in ether, in which the pival amide remained dissolved.

What is claimed is:
1. Pivaloyloxyethyl methacrylate polymers containing structural units having the general formula:

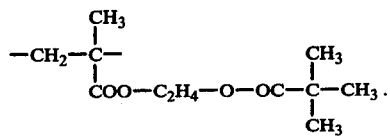

2. A method for the preparation of a pivaloyloxyalkyl methacrylate polymer containing structural units having the general formula:

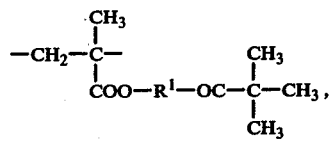

which comprises providing a mixture of a peroxy-type free-radical polymerization initiator and a pivaloyloxyalkyl methacrylate having the general formula:

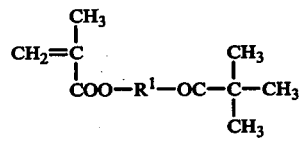

where $R^1$ is $(CH_2)_{n_1}$ — O or $(CH_2CH_2—O)_{n_2}$, $n_1$ being 2 to 10 and $n_2$ being 1 to 4.

3. A method for the preparation of a pivaloyloxyethyl methacrylate polymer containing structural units having the general formula:

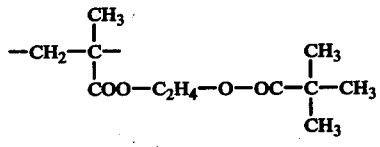

which comprises providing a mixture of a peroxy-type free-radical polymerization initiator and pivaloyloxyethyl methacrylate having the formula:

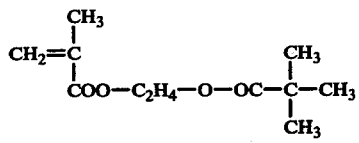

4. A method as set forth in claim 2, wherein a solution of pivaloyloxyalkyl methacrylate in an organic solvent is used.

5. A method as set forth in claim 2, wherein the polymerization is carried out in bulk.

* * * * *